(12) United States Patent
Asagi

(10) Patent No.: US 11,300,834 B2
(45) Date of Patent: Apr. 12, 2022

(54) LIQUID CRYSTAL DISPLAY DEVICE

(71) Applicant: SHARP KABUSHIKI KAISHA, Osaka (JP)

(72) Inventor: Hiroaki Asagi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1 day.

(21) Appl. No.: 16/833,292

(22) Filed: Mar. 27, 2020

(65) Prior Publication Data

US 2020/0310199 A1   Oct. 1, 2020

Related U.S. Application Data

(60) Provisional application No. 62/826,786, filed on Mar. 29, 2019.

(51) Int. Cl.
*C09K 19/56* (2006.01)
*G02F 1/1337* (2006.01)
(Continued)

(52) U.S. Cl.
CPC ......... *G02F 1/133711* (2013.01); *C09K 3/10* (2013.01); *C09K 19/0208* (2013.01); *C09K 19/56* (2013.01); *G02F 1/1339* (2013.01); *G02F 1/1368* (2013.01); *C09K 2200/0625* (2013.01); *C09K 2323/00* (2020.08); *C09K 2323/02* (2020.08); *C09K 2323/027* (2020.08); *C09K 2323/05* (2020.08); *G02F 1/133512* (2013.01); *G02F 1/133514* (2013.01)

(58) Field of Classification Search
CPC ............. G02F 1/133711; G02F 1/1339; G02F 1/1337; G02F 1/133723; G02F 1/133788; G02F 1/133726; C09K 3/10; C09K 19/0208; C09K 19/56; C09K 2200/0625; C09K 2323/00; C09K 2323/02; C09K 2323/025; C09K 2323/027; C09K 2323/05
USPC ............... 428/1.1, 1.2, 1.25, 1.26, 1.5, 1.54; 349/123, 153, 190
See application file for complete search history.

(56) References Cited

U.S. PATENT DOCUMENTS

| | | | |
|---|---|---|---|
| 2003/0147032 A1* | 8/2003 | Park | G02F 1/1339 349/124 |
| 2015/0002799 A1* | 1/2015 | Miyake | G02F 1/133788 349/123 |

FOREIGN PATENT DOCUMENTS

| | | |
|---|---|---|
| JP | 2018-151438 A | 9/2018 |
| WO | 2019/004433 A1 | 1/2019 |

* cited by examiner

*Primary Examiner* — Ruiyun Zhang
(74) *Attorney, Agent, or Firm* — ScienBiziP, P.C.

(57) ABSTRACT

A liquid crystal display device of the present invention includes a thin-film transistor substrate, a counter substrate facing the thin-film transistor substrate, a liquid crystal layer provided between the thin-film transistor substrate and the counter substrate, an alignment film provided on the thin-film transistor substrate; a sealing material which bonds together the thin-film transistor substrate and the counter substrate at the periphery of the liquid crystal layer, and a polymerized layer provided on the liquid crystal layer-side surface of the alignment film. The alignment film contains a first polymer and a second polymer of a different type from that of the first polymer and is chemically bonded to the sealing material, the first polymer and the second polymer contained in the alignment film are mixed in a surface layer in contact with the liquid crystal layer, and the first polymer and the second polymer have different photo-functional groups.

8 Claims, 2 Drawing Sheets

(51) Int. Cl.
  *C09K 19/02*  (2006.01)
  *C09K 3/10*   (2006.01)
  *G02F 1/1339* (2006.01)
  *G02F 1/1368* (2006.01)
  *G02F 1/1335*  (2006.01)

LIQUID CRYSTAL DISPLAY DEVICE

TECHNICAL FIELD

The present invention relates to a liquid crystal display device.

BACKGROUND ART

A liquid crystal display device is a display device using a liquid crystal for display, and a typical display mode thereof is that in which a liquid crystal panel having a liquid crystal sealed between a pair of substrates is irradiated with light from a backlight, and alignment of liquid crystal molecules is changed by applying a voltage to the liquid crystal, thereby controlling the quantity of light transmitted through the liquid crystal panel. Such a liquid crystal display device has the properties such as thin type, light weight, and low power consumption, and is thus used for electronic devices such as a smartphone, a tablet PC, a car navigation, and the like.

In recent years, there has been known a technique in which in a liquid crystal display device in a liquid crystal driving mode, such as a FFS (Fringe Field Switching) mode, an IPS (In Plane Switching) mode, or the like, transmittance is improved by setting the alignment regulating force of an alignment film on the thin-film transistor (hereinafter, TFT) substrate side as "weak anchoring (may be zero anchoring)", and the alignment regulating force of an alignment film on the opposite substrate side as "strong anchoring".

For example, Patent Literature 1 discloses a method for producing a zero-surface anchoring film by UV irradiation or the like of a liquid crystal composition, prepared by adding a radical-polymerizable compound to a liquid crystal, in the state of being in contact with a radical-generating film (alignment film).

In addition, Patent Literature 2 describes a technique for improving responsiveness while maintaining bright display by using an alignment film having a strong-anchoring part and a weak-anchoring part mixed in the surface thereof.

CITATION LIST

Patent Literature

[PTL 1] International Patent Publication No. 2019/004433
[PTL 2] Japanese Unexamined Patent Application Publication No. 2018-151438

SUMMARY OF INVENTION

Technical Problem

However, the zero-surface anchoring film described in Patent Literature 1 has only a weak anchoring part without a strong anchoring part, and thus the technique described in Patent Literature 1 has a room for improvement in characteristics such as response speed and image-sticking characteristic. In addition, Patent Literature 1 does not describe a sealing material for bonding together a pair of substrates and does not at all investigate about the adhesion between the zero-surface anchoring film and the sealing material.

The technique described in Patent Literature 2 uses, as an alignment film material, a copolymer having a high polar part serving as a strong-anchoring part and a non-polar part serving as a weak-anchoring part, and causes weak adhesion to the sealing material because the area ratio of the weak-anchoring part (non-polar part) is as high as 70% to 90%. Also, the alignment film formed from the copolymer is not subjected to uniaxial alignment treatment such as photo-alignment treatment, rubbing alignment, or the like, and thus has poor alignment property.

The present invention has been achieved in consideration of the present situation described above, and an object thereof is to provide a liquid crystal display device excellent in transmittance, image-sticking characteristic, and seal adhesion.

Solution to Problem (1) An embodiment of the present invention relates to liquid crystal display device including a thin film transistor substrate, a counter substrate facing the thin-film transistor substrate, a liquid crystal layer provided between the thin-film transistor substrate and the counter substrate, an alignment film provided on the thin-film transistor substrate, a sealing material which bonds together the thin-film transistor substrate and the counter substrate at the periphery of the liquid crystal layer, and a polymerized layer provided on the liquid crystal layer-side surface of the alignment film. The alignment film contains a first polymer and a second polymer of a different type from the first polymer and is chemically bonded to the sealing material, and the first polymer and the second polymer in the alignment film are mixed in a surface layer in contact with the liquid crystal layer, the first polymer and the second polymer having different photo-functional groups.

(2) An embodiment of the present invention relates to a liquid crystal display device in which, in addition to the configuration described above in (1), the liquid crystal driving mode of the liquid crystal display device is an IPS mode, a FFS mode, or a TN mode.

(3) An embodiment of the present invention relates to a liquid crystal display device in which, in addition to the configuration described above in (1) or (2), the first polymer has as the photo-functional group at least one group selected from the group consisting of a cyclobutane group, an azobenzene group, a chalcone group, a cinnamate group, a coumarin group, a stilbene group, a phenol ester group, and a phenyl benzoate group.

(4) An embodiment of the present invention relates to a liquid crystal display device in which, in addition to the configuration described above in (1), (2), or (3), the alignment film contains as the first polymer at least one polymer selected from the group consisting of a photo-decomposable polymer, a photo-rearrangeable polymer, a photo-isomerizable polymer, a photo-dimerizable polymer, and a photo-crosslinkable polymer.

(5) An embodiment of the present invention relates to a liquid crystal display device in which, in addition to the configuration described above in (1), (2), (3), or (4), the second polymer has as the photo-functional group at least one group selected from the group consisting of an acrylate group, a methacrylate group, a cinnamoyl group, a coumarin group, a vinyl group, an allyl group, a styryl group, and a maleimide group.

(6) An embodiment of the present invention relates to a liquid crystal display device in which, in addition to the configuration described above in (1), (2), (3), (4), or (5), the sealing material has at least one group selected from the group consisting of an acrylate group, a methacrylate group, a vinyl group, a vinyl ether group, an allyl group, a cinnamoyl group, a styryl group, a maleimide group.

(7) An embodiment of the present invention relates to a liquid crystal display device in which, in addition to the configuration described above in (1), (2), (3), (4), (5), or (6), the polymerized layer contains a third polymer produced by polymerizing at least one monomer added to the liquid crystal layer.

(8) An embodiment of the present invention relates to a liquid crystal display device in which, in addition to the configuration described above in (7), the at least one monomer contains an alkyl group.

(9) An embodiment of the present invention relates to a liquid crystal display device in which, in addition to the configuration described above in (7) or (8), the at least one monomer contains at least one group selected from the group consisting of an acrylate group, a methacrylate group, a cinnamoyl group, a coumarin group, a vinyl group, an allyl group, a styryl group, and a maleimide group.

(10) An embodiment of the present invention relates to a liquid crystal display device in which, in addition to the configuration described above in (7), (8), or (9), the at least one monomer contains at least one monomer selected from the group consisting of a methacrylate ester, an acrylate ester, an itaconate ester, a fumarate ester, a maleate ester, and a crotonate ester.

Advantageous Effects of Invention

According to the present invention, it is possible to provide a liquid crystal display device excellent in transmittance, image-sticking characteristic, and seal adhesion.

DESCRIPTION OF EMBODIMENTS

Definition of Terms

First, the definitions the terms used in the specification of the present invention are described below.

The "observation surface side" represents the side nearer to a screen (display surface) of a liquid crystal display device, and the "back surface side" represents the side farther from a screen (display surface) of a liquid crystal display device.

The "photo-functional group" represents a group which can cause photoreaction. The photo-functional group may be a functional group (also referred to as an "alignable functional group" hereinafter) which can exhibit an alignment regulating force to liquid crystal molecules due to a structural change, for example, such as dimerization (dimer formation), isomerization, photo Fries rearrangement, decomposition (cleavage), or the like, caused by irradiation with light (electromagnetic waves, preferably polarized light, more preferably polarized ultraviolet light, and particularly preferably linearly polarized ultraviolet light) such as ultraviolet light, visible light, or the like, or may be a functional group (also referred to as a "polymerizable photo-functional group" hereinafter) which can impart, to a monomer, the energy for initiating the polymerization reaction of a monomer in a liquid crystal due to the radicals generated by irradiation with light such as ultraviolet light, visible light, or the like. Examples of the alignable photo-functional group include an azobenzene group, a chalcone group, a cinnamate group, a coumarin group, a tolan group, a stilbene group, a cyclobutane group, and the like, and example of the polymerizable photo-functional group include an acrylate group, a methacrylate group, a cinnamoyl group, a coumarin group, a vinyl group, an allyl group, a styryl group, a maleimide group, and the like.

In the specification of the present invention, a mode for aligning liquid crystal molecules in a substantially horizontal direction to each of the main surfaces of a pair of substrates without the voltage applied to the liquid crystal layer is also referred to as a "horizontal alignment mode". The "substantially horizontal" represents, for example, that the pretilt angle of liquid crystal molecules is 0° or more and 5° or less with respect to the main surface of each of the substrates. The term "pretilt angle" represents the angle formed by the long axis of a liquid crystal molecule with respect to a substrate surface on the assumption that the substrate surface is 0°, and the substrate normal line is 90° when the voltage applied to the liquid crystal layer is less than the threshold voltage (including no-voltage application).

An embodiment of the present invention is described below. The present invention is not limited to the contents described below in the embodiment, and design can be appropriately changed within a range which satisfies the configuration of the present invention.

Embodiment 1

Figure 1:
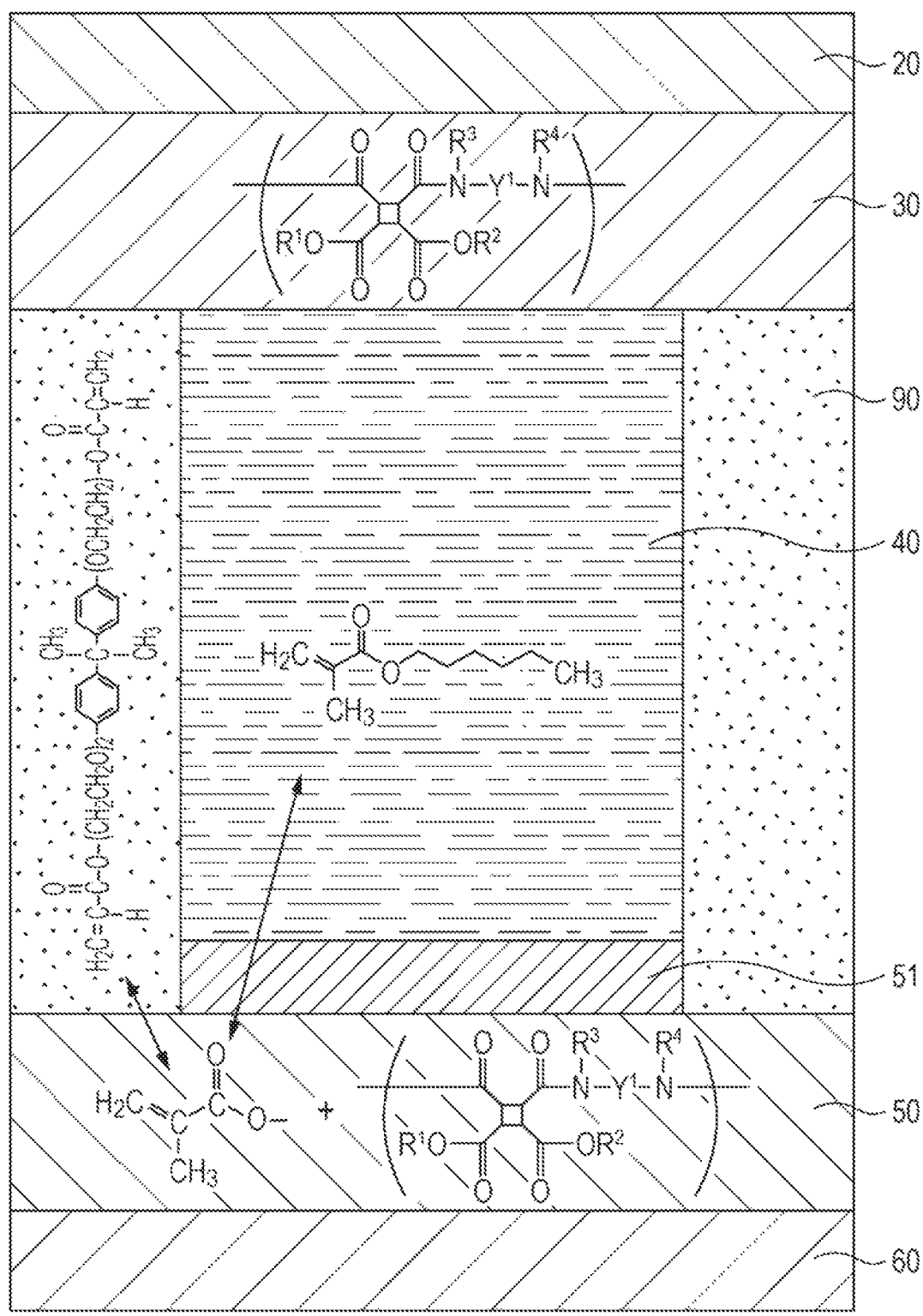
FIG. 1 is a schematic sectional view showing a cell configuration of a liquid crystal display device according to Embodiment 1.

First, the outline of an embodiment is described by using FIG. 1. The present embodiment takes measures (1) and (2) described below as improvement measures for solving the problem described above.

(1) A strong anchoring region and a weak anchoring region are mixed in an alignment film 50 on the horizontal alignment-mode TFT (thin-film transistor) substrate 60 side.

(2) The alignment film 50 on the TFT substrate 60 side is chemically bonded to a sealing material 90.

According to the above (1), transmittance and image-sticking characteristic can be made excellent, and according to the above (2), seal adhesion can be improved.

In order to realize the above (1) and (2), methods (a) to (c) described below are used.

(a) At least two polymers including a first polymer and a second polymer are used as a material of the alignment film 50 on the TFT substrate 61 side.

(b) The first polymer and the second polymer are allowed to have different photo-functional groups.

(c) The photo-functional group (for example, a methacrylate group) of the second polymer is reacted with the monomer (for example, hexyl methacrylate) added to a material (liquid crystal material) of a liquid crystal layer 40 in an active area and is reacted with a compound (for example, bisphenol A diacrylate) in the sealing material 90 in a seal-applied area.

According to the above (a), it is possible to create a state where the first polymer and the second polymer coexist after the alignment film 50 is formed, and to allow the first polymer and the second polymer to be present in a surface layer of the alignment film 50. According to the above (b), a polymer for photo-alignment treatment, which is uniaxial alignment treatment, can be used as the first polymer, and a region where the first polymer is present in the surface layer is allowed to be serve as the strong anchoring region by photo-alignment treatment. Therefore, the image-sticking characteristic can be improved. Also, according to the above (b), a polymer reactable with both the monomer in the liquid crystal layer 40 and the sealing material 90 by light irradiation can be used as the second polymer as described in the above (c). As a result, the second polymer can be chemically reacted with the monomer in the liquid crystal layer 40, and the region where the second polymer is present in the surface layer is allowed to be serve as the weak anchoring region. Thus, the transmittance can be improved. In addition, the second polymer can be chemically reacted with the sealing material 90, and thus a liquid crystal display device having high seal adhesion and excellent panel strength can be realized.

Thus, the present embodiment is different from the technique described in Patent Literature 1 in that at least two polymers including the first polymer and the second polymer are used to allow the strong anchoring region and the weak anchoring region to coexist in the TFT substrate-side alignment film 50. Therefore, as described above, the image-sticking characteristic can be improved, and the response speed can be improved. The present embodiment is also different from the technique described in Patent Literature 1 in that the second polymer is chemically bonded to the sealing material. This can improve the seal adhesion.

In addition, the present embodiment is different from the technique described in Patent Literature 2 in that the different polymers, that is, the first polymer and the second polymer, are present in the strong anchoring region and the weak anchoring region, respectively. Therefore, the seal adhesion can be strengthened by chemically bonding the second polymer to the sealing material 90 while the alignment property can be made excellent by imparting uniaxial alignment to the alignment film through photo-alignment treatment of the first polymer.

The configuration of the liquid crystal display device of the present embodiment is described below by using FIG. 2.

Figure 2:
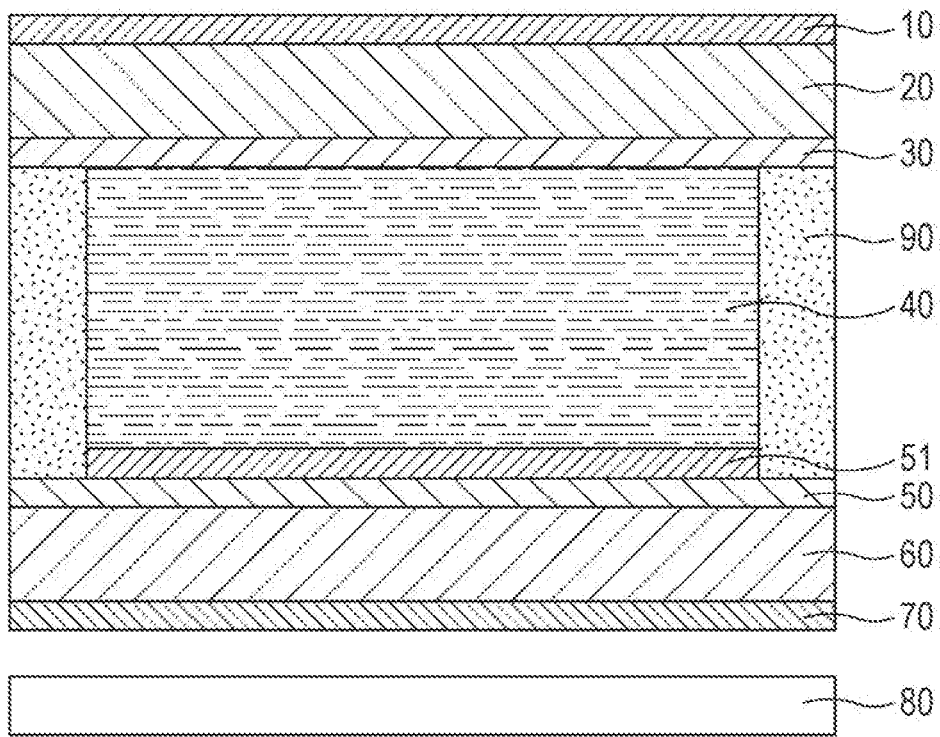
FIG. 2 is a schematic sectional view showing a whole configuration of a liquid crystal display device according to Embodiment 1.

FIG. 2 is a schematic sectional view showing the configuration of the liquid crystal display device of Embodiment 1. As shown in FIG. 2, the liquid crystal display device of Embodiment 1 is a horizontal alignment-mode liquid crystal display device including, in order from the observation surface side to the back surface side, a linearly polarizing plate 10, a counter substrate 20, an alignment film 30, a liquid crystal layer 40, a polymerized layer 51, an alignment film 50, a thin-film transistor (TFT) substrate 60, a linearly polarizing plate 70, and a backlight 80. The light crystal display device of Embodiment 1 further includes a sealing material 90 which bonds together the counter substrate 20 and the TFT substrate 60 at the periphery of the liquid crystal layer 40. The polymerized layer 51 may be provided over the entire region of the liquid crystal layer 40-side surface of the alignment film 50 (however, within the region surrounded by the sealing material 90 in a plan view) as shown in FIG. 1, or may be partially provided on the liquid crystal layer 40-side surface of the alignment film 50 (however, within the region surrounded by the sealing material 90 in a plan view).

Usable examples of the linearly polarizing plate 10 include a polarizer (absorption-type polarizing plate) produced by dyeing and adsorbing an isotropic material an iodine complex (or a dye) or the like on a polyvinyl alcohol (PVA) film and then stretching and orienting the film, and the like. In general, in order to secure mechanical strength and moist-heat resistance, a protective film such as a tri-acetyl cellulose (TAC) film or the like is laminated on either side of a PVA film, which is then brought into practical use.

The counter substrate 20 is a color filter (CF) substrate and includes, in order from the observation surface side to the back surface side, a transparent substrate (not shown), a color filter/black matrix (not shown), and if required, a planerization film (not shown).

Examples of the transparent substrate of the counter substrate 20 include a glass substrate, a plastic substrate, and the like.

The color filter/black matrix has a configuration in which a red color filter, a green color filter, and a blue color filter are arranged in a plane and partitioned by a black matrix. The red color filter, the green color filter, the black color filter, and the black matrix are each composed of, for example, a transparent resin containing a pigment. In general, a combination of the red color filter, the green color filter, and the blue color filter is arranged in each of all pixels, and the color lights transmitted through the red color filter, the green color filter, and the blue color filter are mixed while being controlled in quantity, thereby obtaining a desired color in each of the pixels.

The alignment films 30 and 50 are horizontal alignment films which align liquid crystal molecules substantially horizontally to the film surfaces. In addition, the TFT substrate 60-side alignment film 50 is a photo-alignment film having a photo-functional group and subjected to photo-alignment treatment as uniaxial alignment treatment, while the counter substrate 20-side alignment film 30 may be a photo-alignment film having a photo-functional group and subjected to photo-alignment treatment as uniaxial alignment treatment or may be an alignment film not subjected to alignment treatment, but is preferably a photo-alignment film. The material of the alignment film 30 is not particularly limited, and, for example, a decomposable photo-alignment film material can be used.

The alignment film 50 contains the first polymer and the second polymer of a type different from that of the first polymer, and the alignment film 50 contains the first polymer and the second polymer mixed in the surface layer in contact with the liquid crystal layer 40. Therefore, in the liquid crystal layer 40-side surface of the alignment film 50, a region where the first polymer is present serves as the strong-anchoring region and a region where the second polymer is present serves as the weak-anchoring region, and these regions can be mixed.

The first polymer and the second polymer have photo-functional groups different from each other. Thus, the first polymer and the second polymer can be imparted with functions different from each other. Specifically, photo-alignment treatment of the first polymer imparts uniaxial alignment to the first polymer, thereby enabling the formation of the strong-anchoring region. On the other hand, the second polymer is irradiated with light to enable the second polymer to be reacted with the monomer added to the liquid crystal material, thereby enabling the formation of the weak-anchoring region. Also, the second polymer is irradiated with light to enable the second polymer to be reacted and chemically bonded to the sealing material 90.

In addition, the alignment film 50, particularly the second polymer, is chemically bonded to the sealing material 90, preferably covalently bonded thereto. This improves the seal adhesion. The target to be chemically bonded to the second polymer may be generally a part or component of all components constituting the sealing material 90.

The type of the photo-functional group possessed by the first polymer is not particularly limited but is generally an alignable photo-functional group, and more specific preferred examples thereof include a cyclobutane group, an azobenzene group, a chalcone group, a cinnamate group, a coumarin group, a stilbene group, a phenol ester group, and a phenyl benzoate group. These can be used alone or in combination of two or more. Among these, from the viewpoint of alignment stability, a polymer having a cyclobutane group in its main chain is particularly preferred as the first polymer. The photo-functional group of the first polymer may be present in the main chain of the first polymer, may be present in a side chain of the first polymer, or may be present in both the main chain and side chain of the first polymer.

The photo-reaction type of the first polymer is also not particularly limited, and preferred examples thereof include a photo-decomposable polymer, a photo-rearrangeable polymer (preferably a photo Fries rearrangeable polymer), a photo-isomerizable polymer, a photo-dimerizable polymer, and a photo-cross linkable polymer. These can be used alone or in combination of two or more. Among these, from the viewpoint of alignment stability, a photo-decomposable polymer having a reaction wavelength (main sensitivity wavelength) near 254 nm and a photo-decomposable polymer are particularly preferred. A photo-isomerizable polymer and photo-dimerizable polymer having a photo-functional group in a side chain thereof are also preferred.

The type of the photo-functional group possessed by the second polymer is not particularly limited and is generally a polymerizable photo-functional group, and more specific preferred examples thereof include an acrylate group (acryloyl group), a methacrylate group (methacryloyl group), a cinnamoyl group, a coumarin group, a vinyl group, an allyl group, a styryl group, and a maleimide group. These may be used alone or in combination of two or more. Among these, from the viewpoint of reactivity, a (meth)acrylate group is more preferred. The acrylate group and methacrylate group possessed by the second polymer may be an acryloyloxy group and a methacryloyloxy group, respectively. The photo-functional group of the second polymer may be present in the main chain of the second polymer, may be present in a side chain of the second polymer, or may be present in both the main chain and side chain of the second polymer, but is preferably present in at least a side chain of the second polymer.

The reaction wavelengths of the photo-functional groups of the first polymer and the second polymer are not particularly limited but are preferably different from each other.

Also, the first polymer and the second polymer may be chemically bonded (covalently bonded) to each other.

Preferred examples of the main chain structures of the first polymer and the second polymer include, but are not particularly limited to, a polyamic acid structure, a polyimide structure, a poly(meth)acrylic acid structure, and a polysiloxane structure. From the viewpoint of making it easy to form a state where the first polymer and the second polymer coexist in the surface layer of the alignment film 50, the main chain structures of the first polymer and the second polymer are preferably the same.

The alignment film 30 can be formed by the same method as for a general photo-alignment film. That is, first an alignment film ink (liquid crystal aligning agent) is prepared by dissolving the first polymer and the second polymer as solid contents in one or more solvents, and then applied on the surface of the TFT substrate 60 by a method such as a roll coater method, a spinner method, a printing method, an ink jet method, or the like. Next, the solvent in the alignment film ink is evaporated by preliminarily drying (calcining) the surface of the TFT substrate 60, forming the alignment film 30. Next, the alignment film 30 is irradiated with linearly polarized ultraviolet light as uniaxial alignment treatment. Then, the alignment film 30 is again fired by heating the TFT substrate 60.

The ratio (weight ratio) of the first polymer to the second polymer in the alignment film ink is not particularly limited, but is preferably (first polymer):(second polymer)=1:99 to 90:10 and more preferably 5:95 to 50:50.

The ratio of the photo-functional group introduced into the molecular structure of each of the first polymer and the second polymer is not particularly limited and may be properly adjusted. Each of the first polymer and the second polymer may contain the photo-functional group in all repeating units or may be in a copolymerized state of a molecular structure (repeating unit) containing the photo-functional group and another molecular structure (repeating unit) not containing the photo-functional group.

Also, the concentration of the solid content (the first polymer and the second polymer) in the alignment film ink, that is, the ratio by weight (h by weight) of the solid content to the total weight of the alignment film ink, is not particularly limited, but is preferably 1% to 20% by weight and more preferably 3% to 10% by weight.

The sealing material 90 preferably has at least one group selected from the group consisting of an acrylate group (acryloyl group), a methacrylate group (methacryloyl group), a cinnamoyl group, a coumarin group, a vinyl group, an allyl group, a styryl group, and a maleimide group. Thus, the sealing material 90 can be easily chemically bonded to the second polymer. Among these, from the viewpoint of reactivity, a (meth)acrylate group is more preferred, and the sealing material 90 particularly preferably contains a compound having (meth)acrylate groups at both ends. Further, from the viewpoint of strengthening the bond of the sealing material 90, the sealing material 90 preferably has a thermally reactive glycidyl group. Therefore, curing of the sealing material 90 is allowed to proceed by heating, and thus a liquid crystal display device having excellent reliability can be produced. The acrylate group and methacrylate group possessed by the sealing material 90 may be an acryloyloxy group and a methacryloyloxy group, respectively.

Although the above description is made of the case where the sealing material 90 is chemically bonded to the second polymer, the sealing material 90 may be chemically bonded (covalently bonded) to the first polymer, not the second polymer, or may be chemically bonded (covalently bonded) to both the first polymer and the second polymer.

The polymerized layer (polymer layer) 51 is formed from the third polymer on the liquid crystal layer 40-side surface of the TFT substrate 60-side alignment film 50. The third polymer is chemically bonded, preferably covalently bonded, to the second polymer of the alignment film 50. Therefore, the third polymer can weaken the anchoring energy of the region where the second polymer is present.

The third polymer is preferably a polymer produced by polymerizing at least one monomer (also referred to as an "additive" hereinafter) added to the liquid crystal layer 40. Thus, the polymerized layer 51 can be easily formed. Monomers can be used singly or in combination of two or more as the additive. The polymerized layer (polymer layer) 51 can be formed by an additional irradiation process in which the additive is polymerized by ultraviolet irradiation of the liquid crystal layer 40 to which the additive has been added. In this case, the additive may be polymerized by its own absorption of ultraviolet light to form a polymer, or the additive in the liquid crystal layer 40 may be polymerization-reacted by the radicals generated by ultraviolet absorption of the second polymer of the alignment film 50, thereby forming a polymer.

The amount of additive introduced is preferably 0.1 to 10% by weight and more preferably 0.2% to 5% by weight relative to the whole of the liquid crystal containing the additive and the liquid crystal.

In order to form the weak-anchoring part by forming the polymerized layer 51, the additive preferably contains an alkyl group. The alkyl group contained in the additive is preferably an alkyl group having 2 to 20 carbon atoms, and particularly preferably an alkyl group having 4 to 16 carbon atoms. In addition, the alkyl group contained in the additive may have a linear structure, a branched structure, or a cyclic structure. Also preferred is the additive having a plurality of alkyl groups having different numbers of carbon atoms in the molecular structure thereof.

The additive preferably contains at least one group selected from the group consisting of an acrylate group (acryloyl group), a methacrylate group (methacryloyl group), a cinnamoyl group, a coumarin group, a vinyl group, an allyl group, a styryl group, and a maleimide group. Thus, the third polymer can be easily chemically bonded to the second polymer. The acrylate group and methacrylate group possessed by the additive may be an acryloyloxy group and a methacryloyloxy group, respectively.

The specific type of the additive is not particularly limited, but preferred examples thereof include unsaturated fatty acid esters such as methacrylate esters, acrylate esters, itaconate esters, fumarate esters, maleate esters, crotonate esters, and the like. These can be used alone or in combination of two or more. By using the additive, the polymerized layer 51 can be formed only on the TFT substrate 60-side alignment film 50 by the additional irradiation process.

Although the above description is made of the case where the third polymer is chemically bonded to the second polymer, the third polymer need not necessarily be chemically bonded to the alignment film 50, and the polymerized layer 51 may be formed in the state where the third polymer is deposited on the alignment film 50 so as to weaken the anchoring energy of the alignment film 50.

The liquid crystal layer 40 is a horizontal alignment liquid crystal layer and contains a liquid crystal which is horizontally aligned with no voltage application. Either a positive liquid crystal or a negative liquid crystal can be used as the liquid crystal. The liquid crystal layer 40 contains liquid crystal molecules aligned in a predetermined direction with no voltage application. The predetermined direction (initial alignment direction) is properly determined according to the liquid crystal driving mode, and in the horizontal alignment mode, the liquid crystal molecules are aligned in a direction substantially horizontal to the main surface of each of the substrates 20 and 60 with no voltage application.

A general active matrix substrate in the liquid crystal display device field can be used as the thin-film transistor (TFT) substrate 60. The liquid crystal driving mode (liquid crystal display mode) of the liquid crystal display device of the present embodiment is not particularly limited as long as it is the horizontal alignment mode, and usable examples thereof include horizontal alignment modes such as a TN (Twisted Nematic) mode, a FFS mode, an IPS mode, and the like.

When the liquid crystal driving mode of the liquid crystal display device of the present embodiment is the FFS mode, the TFT substrate 60 includes, for example, a transparent substrate, a common electrode (planar electrode) disposed on the liquid crystal layer 40-side surface of the transparent substrate, an insulation film which covers the common electrode, a pixel electrode (comb-shaped electrode) disposed on the liquid crystal layer 40-side surface of the insulation film. The electrode structure (may be referred to as the "FFS electrode structure" hereinafter) can generate a lateral electric field (fringe electric field) in the liquid crystal layer 40 by applying a voltage between the common electrode and the pixel electrode, which constitute a pair of electrodes. Thus, the liquid crystal alignment in the liquid crystal layer 40 can be controlled by adjusting the voltage applied between the common electrode and the pixel electrode.

When the liquid crystal driving mode of the liquid crystal display device of the present embodiment is the IPS mode, a lateral electric field is generated in the liquid crystal layer 40 by applying a voltage between a pair of comb-shaped electrodes provided on the TFT substrate 60, and the liquid crystal alignment in the liquid crystal layer 40 is controlled.

Also, when the liquid crystal driving mode of the liquid crystal display device of the present embodiment is the TN mode, a pixel electrode is provided on the TFT substrate 60, and a common electrode is provided on the counter electrode 20. Thus, a vertical electric field is generated in the liquid crystal layer 40 by applying a voltage between the common electrode and the pixel electrode, and the liquid crystal alignment in the liquid crystal layer 40 is controlled.

Examples of the transparent substrate of the TFT substrate 60 include a glass substrate, a plastic substrate, and the like.

In the FFS mode and the IPS mode, the alignment films 30 and 50 are aligned so that the initial alignment direction of the alignment film 30 and the initial alignment direction of the alignment film 50 are parallel to each other. On the other hand, in the TN mode, the alignment films 30 and 50 are aligned so that the initial alignment direction of the alignment film 30 and the initial alignment direction of the alignment film 50 are perpendicular to each other in a plan view.

The same as the linearly polarizing plate 10 can be used as the linearly polarizing plate 70. The transmission axis of the linearly polarizing plate 10 and the transmission axis of the linearly polarizing plate 70 are preferably perpendicular to each other. In this configuration, the linearly polarizing plate 10 and the linearly polarizing plate 70 are disposed in a cross-Nicol state, and thus with no voltage application, a good black display state can be realized in the FFS mode and IPS mode, and a good white display state can be realized in the TN mode.

Examples of the system of the backlight 80 include, but are not particularly limited to, an edge light system, a direct system, and the like. Examples of the type of the light source of the backlight 30 include, but are not particularly limited to, a light emitting diode (LED), a cold cathode fluorescent lamp (CCFL), and the like. The amount of the light emitted from the backlight 80 and transmitted through a liquid crystal panel is controlled by the voltage applied to the liquid crystal layer 40.

In addition, the liquid crystal display device of Embodiment 1 may contain other constituent members and, for example, the reflectance of the liquid crystal panel can be decreased by providing an anti-reflection film on the observation surface side of the linearly polarizing plate 10. A moth-eye film having a moth-eye surface structure can be used as the anti-reflection film.

The above description is made of the horizontal alignment-mode liquid crystal display device including, in order from the observation surface side to the back surface side, the linearly polarizing plate 10, the counter substrate 20, the alignment film 30, the liquid crystal layer 40, the polymerized layer 51, the alignment film 50, the TFT substrate 60, the linearly polarizing plate 70, and the backlight 80. However, in the reverse order of this arrangement, the TFT substrate 60 may be on the observation surface side, and the counter substrate 20 may be on the back surface side.

The present invention is described in further detail below by giving examples and comparative examples, but the present invention is not limited only to these examples.

EXAMPLE 1

First, two types of alignment film inks (A) and (B) below were prepared as an alignment film ink.

(A) CF Substrate-Side Alignment Film Ink

An alignment film ink (A) was prepared by mixing polyamic acid (solid content) having, in its main chain skeleton, a cyclobutane ring represented by chemical formula (1-1) below, with solvents below so that the weight ratio was solid content/NMP/γBL/BC/DIBK=4/50/20/18/8.

[Chem. 1]

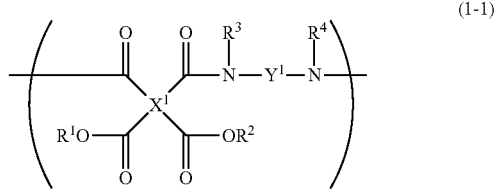

(1-1)

(In the formula, $R^1$, $R^2$, $R^3$, and $R^4$ are the same or different and each represent a hydrogen atom or a hydrocarbon group, $X^1$ represents a tetravalent organic group containing a cyclobutane ring as a photo-functional group, and $Y^1$ represents a divalent organic group.)

In addition, NMP, γBL, BC, and DIBK represent N-methyl-2-pyrrolidone (N-methyl pyrrolidone), γ-butyrolactone, butyl cellosolve (ethylene glycol monobutyl ether), and diisobutyl ketone (2,6-dimethyl-4-heptanone), respectively.

(B) TFT Substrate-Side Alignment Film Ink

An alignment film ink (B) was prepared by mixing polyamic acid (solid content [1-1]) having, in its main chain skeleton, a cyclobutene ring represented by the chemical formula (1-1) described above and polyamic acid (solid content [2-1]) having a methacrylate group represented by chemical formula (2-1) described below with solvents below so that the weight ratio was solid content [1-1]/solid content [2-1]/NMP/γBL/BC/DIBK=0.2/3.8/50/20/18/8. Thus, in this example, a photo-decomposable alignment film material having a cyclobutane ring in the main chain ($X^1$) was used as a strong-anchoring alignment film material.

[Chem. 2]

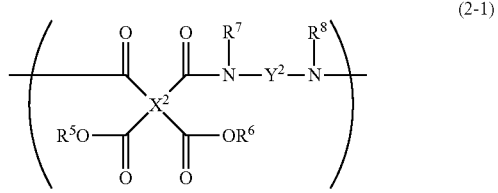

(2-1)

(In the formula, $R^5$, $R^6$, $R^7$, and $R^8$ are the same or different and each represent a hydrogen atom or a hydrocarbon group, $X^2$ represents a tetravalent organic group, and $Y^2$ represents a divalent organic group containing a methacrylate group (methacryloyloxy group) represented by chemical formula (2-1-1) below as a photo-functional group.)

[Chem. 3]

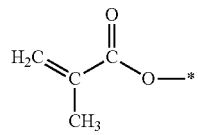

(2-1-1)

(In the formula, * represents a bonding site to a part other than an acryloyloxy group.)

Next, a TFT substrate having a FFS electrode structure and a CF substrate having a photo-spacer (PS) were prepared, and the alignment film inks (A) and (B) were applied by an ink jet coating method on the CF substrate and the TFT substrate, respectively. Then, both substrates were preliminarily dried at 70° C. and then both substrates were heated at 230° C. for 30 minutes. Then, the surface of each of the alignment films was irradiated with linearly polarized ultraviolet light at 254 nm and 1 J/cm² in the substrate normal direction. The degree of polarization of the irradiating polarized ultraviolet light at 254 nm was 30:1. Then, both substrates were again heated at 230° C. for 30 minutes. The thickness of each of the alignment films after firing was about 100 nm.

Then, a thermal/UV combined sealing material containing a diacrylate represented by chemical formula (3-1) below as a component was drawn on the TFT substrate by a dispenser, and the TFT substrate and the CF substrate were bonded together with a liquid crystal material interposed therebetween so that the polarization directions of the irradiated linearly polarized ultraviolet lights were parallel to each other, thereby forming a cell. During bonding (during seal curing), the sealing material was UV-cured through a mask so as to prevent UV irradiation of a portion other than the seal drawn portion. Also, the material used as the liquid crystal material was prepared by adding, to a positive liquid crystal with positive dielectric anisotropy, an acrylate ester as an additive, that is, hexyl methacrylate, represented by chemical formula (4-1) below in an amount of 5% by weight relative to the whole of the liquid crystal material containing the liquid crystal and the additive.

[Chem. 4]

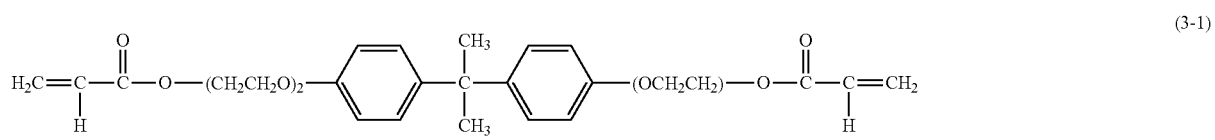

(3-1)

[Chem. 5]

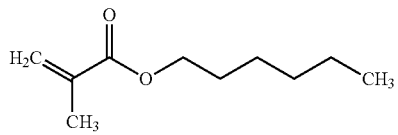

(4-1)

Then, alignment treatment of liquid crystal molecules was again performed by heating the formed cell at 130° C. for 40 minutes, producing a uniformly uniaxially aligned FFS liquid crystal panel.

Further, the panel was irradiated with UVB (ultraviolet B wave) at a main wavelength of 313 nm and 1 J/cm² (additional irradiation process). Consequently, a polymer of the additive in the liquid crystal material was formed only on the TFT substrate side, forming a weak-anchoring region.

Then, the resultant liquid crystal panel was thinned so that the glass thickness of each of the substrates was 0.2 mm. Then, a polarizing plate, a backlight, a control substrate, etc. were mounted to produce a FFS-mode liquid crystal device of Example 1.

COMPARATIVE EXAMPLE 1

A FFS-mode liquid crystal display device of Comparative Example 1 was produced by the same method as in Example 1 except that an alignment film ink (C) prepared by mixing PHMA (polyhexyl methacrylate, solid content) with solvents below so that the weight ratio was solid content/NMP/γBL/BC/DIBK=4/50/20/18/8 was used in place of the alignment film ink (B) as the TFT substrate-side alignment film ink, an additive was not added to the same positive liquid crystal as in Example 1, and the additional irradiation process was not performed.

COMPARATIVE EXAMPLE 2

A FFS-mode liquid crystal display device of Comparative Example 2 was produced by the same method as in Example 1 except that the alignment film ink (A) was used in place of the alignment film ink (B) as the TFT substrate-side alignment film ink, an additive was not added to the same positive liquid crystal as in Example 1, and the additional irradiation process was not performed.

EXAMPLE 2

A FFS-mode liquid crystal display device of Example 2 was produced by the same method as in Example 1 except that an alignment film ink (D) prepared by mixing polyamic acid (solid content [1-2]) having a phenol ester group represented by chemical formula (1-2) described below and polyamic acid (solid content [2-1]) having a methacrylate group represented by the chemical formula (2-1) described above with solvents below so that the weight ratio was solid content [1-2]/solid content [2-1]/NMP/γBL/BC/DIBK=0.2/3.8/50/20/18/8 was used in place of the alignment film ink (B) as the TFT substrate-side alignment film ink. Thus, in this example, a photo Fries rearrangeable alignment film material having a phenol ester group in a side chain ($Y^{1'}$) was used as a strong-anchoring alignment film material.

[Chem. 6]

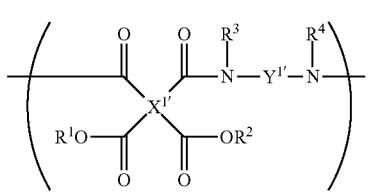

(1-2)

(In the formula, $R^1$, $R^2$, $R^3$, and $R^4$ are the same or different and each represent a hydrogen atom or a hydrocarbon group, $X^{1'}$ represents a tetravalent organic group, and $Y^{1'}$ represents a divalent organic group containing a phenol ester group as a photo-functional group.)

EXAMPLE 3

A FFS-mode liquid crystal display device of Example 3 was produced by the same method as in Example 1 except that an alignment film ink (E) prepared by mixing polyamic acid (solid content [1-1]) having, in its main chain skeleton, a cyclobutane ring represented by the chemical formula (1-1) described above and polyamic acid (solid content [2-2]) having a cinnamate group represented by chemical formula (2-2) described below with solvents below so that the weight ratio was solid content [1-1]/solid content [2-2]/NMP/γBL/BC/DIBK=0.2/3.8/50/20/18/8 was used in place of the alignment film ink (B) as the TFT substrate-side alignment film ink.

[Chem. 7]

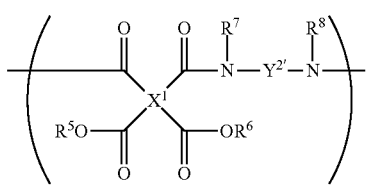

(2-2)

(In the formula, $R^5$, $R^6$, $R^7$, and $R^8$ are the same or different and each represent a hydrogen atom or a hydrocarbon group, $X^2$ represents a tetravalent organic group, and $Y^{2'}$ represents a divalent organic group containing a cinnamate group represented by chemical formula (2-2-1) described below as a photo-functional group.)

[Chem. 8]

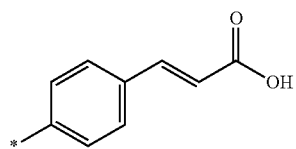

(2-2-1)

(In the formula, * represents a bond site to a part other than a cinnamate group.)

EXAMPLE 4

A FFS-mode liquid crystal display device of Example 4 was produced by the same method as in Example 1 except that a thermal-UV combined sealing material containing as a component a compound having a glycidyl group and an acrylate group represented by chemical formula (3-2) described below was used in place of the diacrylate represented by the chemical formula (3-1) described above as the sealing material.

[Chem. 9]

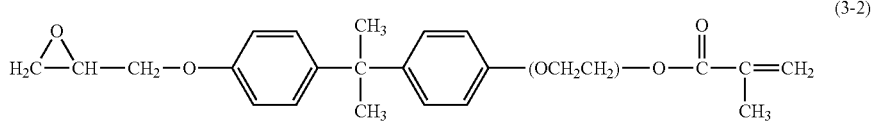

(3-2)

EXAMPLE 5

A FFS-mode liquid crystal display device of Example 5 was produced by the same method as in Example 1 except that an itaconate ester represented by chemical formula (4-2) below was used in place of the acrylate ester represented by the chemical formula (3-1) described above as the additive.

[Chem. 10]

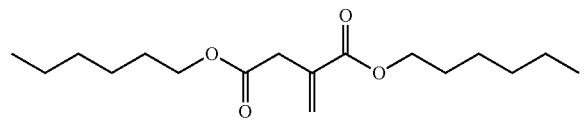

(4-2)

EXAMPLE 6

A FFS-mode liquid crystal display device of Example 6 was produced by the same method as in Example 1 except that a sealing material prepared by adding an initiator, which absorbed UV light and visible light, to the sealing material used in Example 1 was used, and the sealing material was photo-cured by irradiation with visible light in place of UV light without using a mask during bonding (during seal curing).

The transmittance, image-sticking, and seal adhesion of each of the liquid crystal devices produced in Examples 1 to 6 and Comparative Examples 1 and 2 were evaluated.

(Evaluation of Transmittance)

The white transmittance (=white brightness of liquid crystal display device÷brightness of backlight×100) of each of the produced liquid crystal display devices was measured. The brightness was measured by using spectroradiometer SR-UL2 manufactured by Topcon Technohouse Corporation.

(Image-Sticking Test)

A current-carrying test of each of the produced liquid crystal display devices was performed for 6 hours with a white-black checkered pattern, and then 64 gradations (however, the maximum gradations=255 gradations) were displayed over the entire surface. Then, the brightness ratio of a white display portion to a black display portion was measured as an image-sticking brightness ratio. The liquid crystal display device showing an image-sticking brightness ratio of less than 1.1 was determined to have good image-sticking characteristic. The brightness was measured by using the spectroradiometer described above.

(Seal Adhesion)

The weight was measured when the liquid crystal panel was broken by pressing a terminal part of the liquid crystal panel. The liquid crystal panel having 20 N or more was determined as "good" because of high panel strength.

The evaluation results are shown in Table 1.

TABLE 1

| | White transmittance | Image-sticking brightness ratio | Panel peel strength (seal adhesion) |
| --- | --- | --- | --- |
| Comparative Example 1 | ○ 24% | x 2.3 | x 12N |
| Comparative Example 2 | x 17% | ○ 1.04 | Δ 19N |
| Example 1 | ○ 22% | ○ 1.05 | ○ 24N |
| Example 2 | ○ 24% | ○ 1.06 | ○ 26N |
| Example 3 | ○ 22% | ○ 1.08 | ○ 20N |
| Example 4 | ○ 22% | ○ 1.05 | ○ 22N |
| Example 5 | ○ 21% | ○ 1.05 | ○ 24N |
| Example 6 | ○ 22% | ○ 1.04 | ○ 22N |

Example 1 showed a white transmittance of 22%, an image-sticking brightness ratio of 1.05, and a seal peel strength of 24 N, and thus all characteristics were good. Comparative Example 1 showed a good white transmittance of 24%, but showed an image-sticking brightness ratio of 2.3 and a seal peel strength of 12 N, and thus did not satisfy the overall spec as a liquid crystal display device. Comparative Example 2 showed no problem with the image-sticking characteristic and seal adhesion, but showed a low value of white transmittance which was equivalent to ordinary liquid crystal display devices. Examples 2 to 6 showed all excellent characteristics, such as the white transmittance, image-sticking, and seal adhesion.

REFERENCE SIGNS LIST 10, 70: linearly polarizing plate
20: counter substrate
30, 50: alignment film
51: polymer layer
40: liquid crystal layer
60: thin-film transistor (TFT) substrate
80: backlight
90: sealing material

What is claimed is:

1. A liquid crystal display device comprising:
a thin-film transistor substrate;
a counter substrate facing the thin-film transistor substrate;
a liquid crystal layer provided between the thin-film transistor substrate and the counter substrate;
an alignment film provided on the thin-film transistor substrate;
a sealing material which bonds together the thin-film transistor substrate and the counter substrate at the periphery of the liquid crystal layer; and
a polymerized layer provided on a liquid crystal layer-side surface of the alignment film,
wherein:
the alignment film contains a first polymer and a second polymer of a different type from that of the first polymer and is chemically bonded to the sealing material;
the first polymer and the second polymer in the alignment film are mixed in a surface layer in contact with the polymerized layer;
the first polymer and the second polymer have different photo-functional groups;
the first polymer has, as a photo-functional group, at least one group selected from the group consisting of a cyclobutane group, an azobenzene group, a chalcone group, a cinnamate group, a coumarin group, a stilbene group, a phenol ester group, and a phenyl benzoate group;
the polymerized layer contains a third polymer produced by polymerizing at least one monomer added to the liquid crystal layer;
the at least one monomer contains an alkyl group;
the third polymer is covalenty bonded to the second polymer; and
main chain structures of the first polymer and the second polymer are the same.

2. The liquid crystal display device according to claim 1, wherein a liquid crystal driving mode of the liquid crystal display device is an IPS mode, a FFS mode, or a TN mode.

3. The liquid crystal display device according to claim 1, wherein the alignment film contains, as the first polymer, at least one polymer selected from the group consisting of a photo-decomposable polymer, a photo-rearrangeable polymer, a photo-isomerizable polymer, a photo-dimerizable polymer, and a photo-crosslinkable polymer.

4. The liquid crystal display device according to claim 1, wherein the second polymer has, as the photo-functional group, at least one group selected from the group consisting of an acrylate group, a methacrylate group, a cinnamoyl group, a coumarin group, a vinyl group, an allyl group, a styryl group, and a maleimide group.

5. The liquid crystal display device according to claim 1, wherein the sealing material has at least one group selected from the group consisting of an acrylate group, a methacrylate group, a vinyl group, a vinyl ether group, an allyl group, a cinnamoyl group, a styryl group, and a maleimide group.

6. The liquid crystal display device according to claim 1, wherein the at least one monomer contains at least one monomer selected from the group consisting of a methacrylate ester, an acrylate ester, an itaconate ester, a fumarate ester, a maleate ester, and a crotonate ester.

7. The liquid crystal display device according to claim 1, wherein anchoring energy of a region where the first polymer is present is stronger than anchoring energy of a region where the second polymer is present.

8. The liquid crystal display device according to claim 1, wherein the sealing material is covalently bonded to the first polymer or the second polymer.

* * * * *